Oct. 13, 1936.  E. A. GORMAN  2,057,234
DEVICE FOR METERING LIQUIDS
Filed June 15, 1936
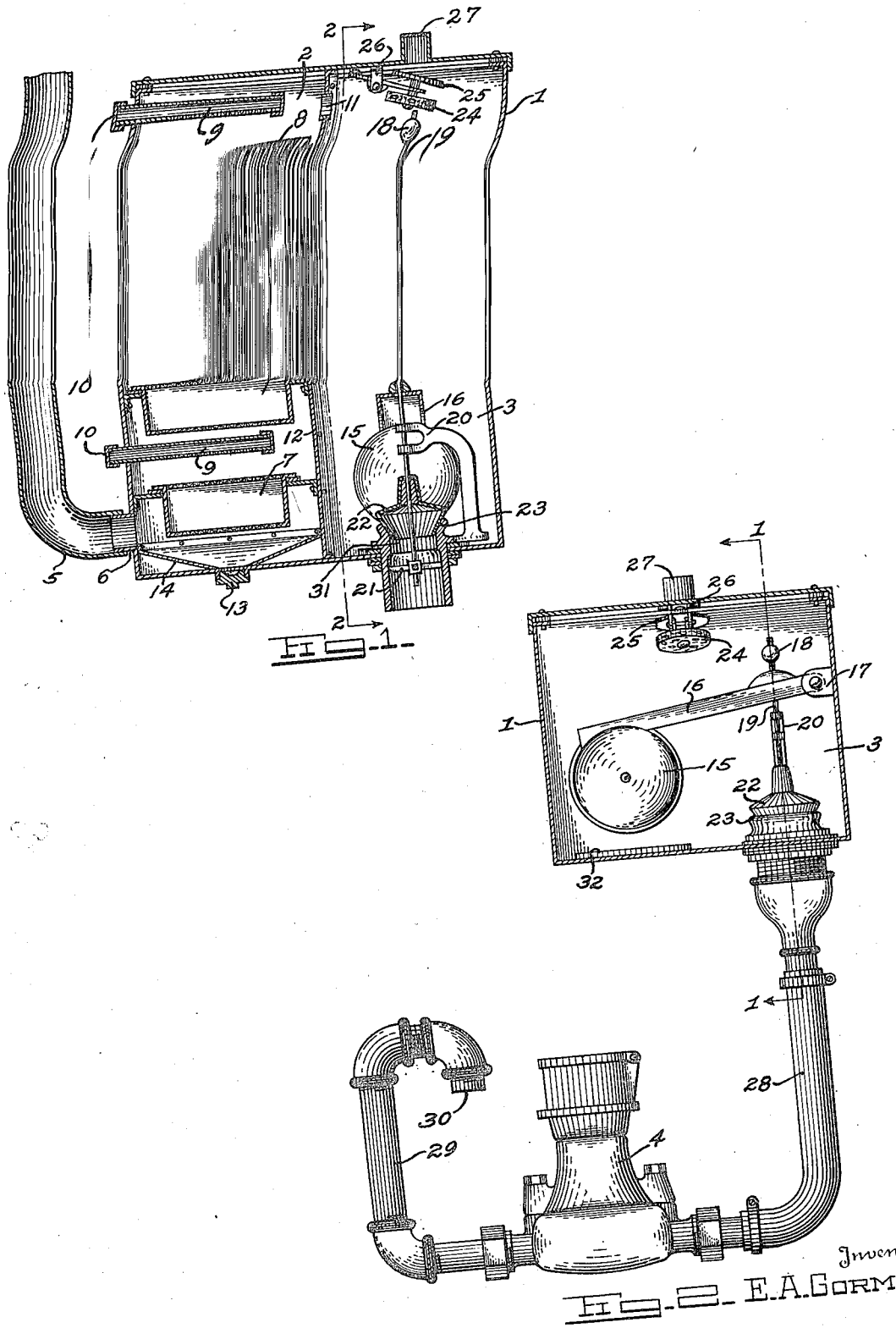
Inventor
E. A. GORMAN liquid may accumulate in said storage means and be discharged therefrom in gulps, a discharge conduit connected to said storage means for conveying the aqueous material from said tank, a flow meter interposed in said conduit for measuring and indicating the quantity of discharged aqueous material conveyed therethrough; said discharge conduit including a U-trap connected to said meter, and a dust-proof air vent having a float-operated valve connected to said storage compartment.

EDWARD A. GORMAN.

Oct. 13, 1936.                B. HAMMER                    2,057,235
           COMBINATION WAIST BAND AND BELT FOR TROUSERS
                          Filed Oct. 1, 1935
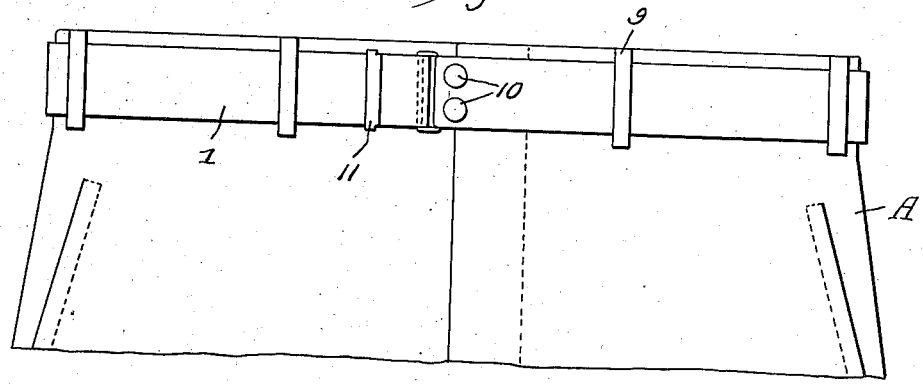
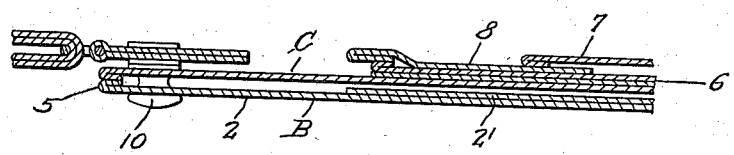
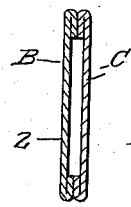
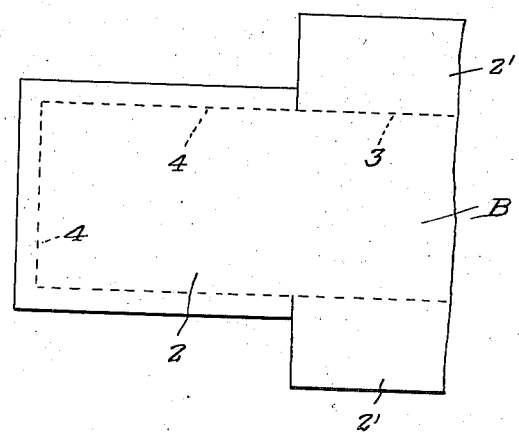
Inventor
*Benjamin Hammer.*
By *Clarence A. O'Brien*
                        Attorney